United States Patent [19]

Chiang

[11] Patent Number: 5,248,232
[45] Date of Patent: Sep. 28, 1993

[54] FIXING MEANS

[76] Inventor: Chih-Chung Chiang, No. 27, Ta-Sheng W. Rd., Tzu-Kuan Hsiang, Kaohsiung Hsien, Taiwan

[21] Appl. No.: 833,218

[22] Filed: Feb. 10, 1992

[51] Int. Cl.$^5$ ............................................. F16B 39/12
[52] U.S. Cl. ..................................... 411/237; 411/223; 411/931
[58] Field of Search ............... 411/237, 244, 222, 243, 411/223, 238, 242, 924, 266, 937.1, 263, 269, 259, 204, 931, 432, 307, 917, 433, 436, 312, 309

[56] References Cited

U.S. PATENT DOCUMENTS

| | | | |
|---|---|---|---|
| 257,854 | 5/1882 | Dillon | 411/222 |
| 876,081 | 1/1908 | Orr | 411/931 X |
| 909,118 | 1/1909 | Richards et al. | 411/307 |
| 1,077,119 | 10/1913 | Bixby | 411/243 |
| 1,157,596 | 10/1915 | Sherman | 411/269 |
| 3,079,181 | 2/1963 | Wissel | 411/307 X |

FOREIGN PATENT DOCUMENTS

| | | | |
|---|---|---|---|
| 79291 | 5/1983 | European Pat. Off. | 411/237 |
| 0130304A1 | 1/1985 | European Pat. Off. | |
| 57345 | 6/1891 | Fed. Rep. of Germany | 411/244 |
| 430249 | 11/1911 | France | 411/223 |
| 722179 | 3/1932 | France | 411/222 |
| 2389 | of 1893 | United Kingdom | 411/223 |
| 14762 | of 1910 | United Kingdom | 411/244 |
| 15391 | of 1914 | United Kingdom | 411/223 |
| 155403 | 12/1920 | United Kingdom | 411/223 |
| 553936 | 6/1943 | United Kingdom | 411/237 |
| 2233058A | 1/1991 | United Kingdom | |

Primary Examiner—Rodney M. Lindsey
Attorney, Agent, or Firm—Lowe, Price, LeBlanc & Becker

[57] ABSTRACT

The nut includes a first half having a short shank with an internal screw thread therethrough and an external screw thread on the short shank and a second half with a threaded bore. The internal thread has a first pitch and the external thread has a second screw pitch, the second and third screw pitches having different vertical lengths. The threaded bore includes a first section and a second section wider than the first section and the length of the short shank. The first section has a screw pitch equal to the first screw pitch and the second section has a third screw pitch slightly finer than that of the second screw pitch.

15 Claims, 2 Drawing Sheets

FIXING MEANS

1. FIELD OF THE INVENTION

This invention relates to a nut and bolt set, more particularly to a nut and bolt set which locks more tightly and securely than prior art sets.

2. DESCRIPTION OF THE RELATED ART

Nuts and bolts are well known in the art. They are widely used as a fastening means for fastening two objects together. There are already nut and bolt sets, such as disclosed in British Patent Nos. 15,391 and 553,936 and in French Patent No. 430,249, each set of which includes a nut having two parts, the combination of said two parts together with the threaded bolt providing a locking mechanism which is difficult to remove or disassemble by easy handling.

SUMMARY OF THE INVENTION

The main object of the present invention is to provide an improved lock nut of said type which lock nut can fasten objects together more firmly and permanently than prior art.

Another object of the present invention is to provide an improved lock nut of the type in which, the lock nut includes two parts which provide a deformation of the threads between the two parts and which synchronously provide a firm and difficult locking mechanism which is difficult to remove or disassemble.

According to the present invention, the lock nut includes a first half and a second half, said first half having a short shank with an internal screw thread therethrough and an external screw thread on the short shank, said internal screw thread of the first half having a first screw pitch and being engageable with the threaded bolt of the present invention and the external screw thread having a second screw pitch different from the first screw pitch. The second half includes a threaded bore with two sections of differing radii, a first section and a second section wider than the first section. The first section has a screw pitch equal to the first screw pitch. The second section has a screw pitch which is slightly finer than the second screw pitch and a length which is slightly longer than the length of the short shank of the first half. The difference in screw pitches between the second section of the second half and the external screw thread of the short shank of the first half provide a deformation of screw pitches when the two parts are locked together leading to a locking mechanism which firmer and more secure than the prior sets.

BRIEF DESCRIPTION OF THE DRAWINGS

Other features and advantages of the present invention will become apparent in the following detailed description, including drawings, all of which show a non-limiting form of the present invention, and in which.

DETAILED DESCRIPTION OF THE PREFERRED EMBODIMENT

Figure 1:
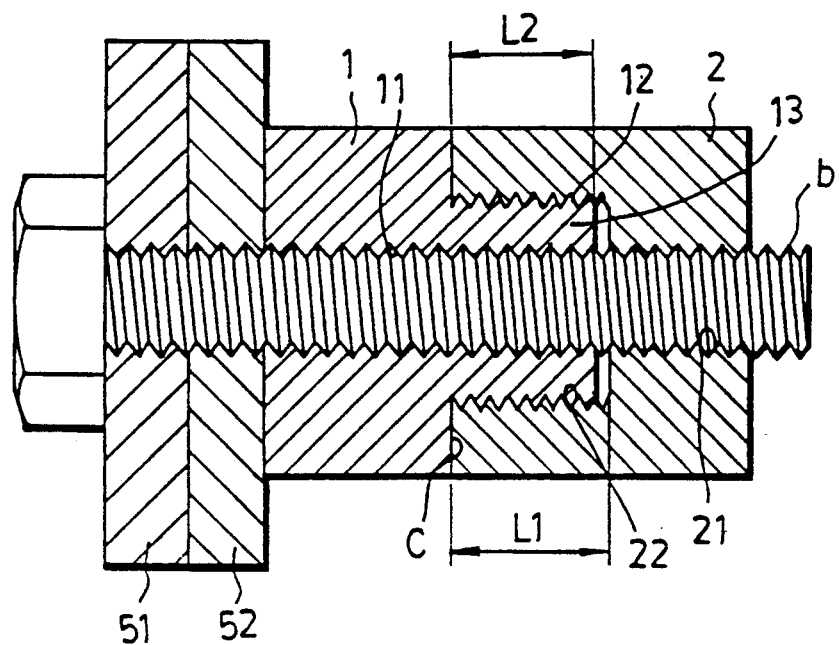
FIG. 1 shows a lock nut of the present invention in application.
Figure 2:
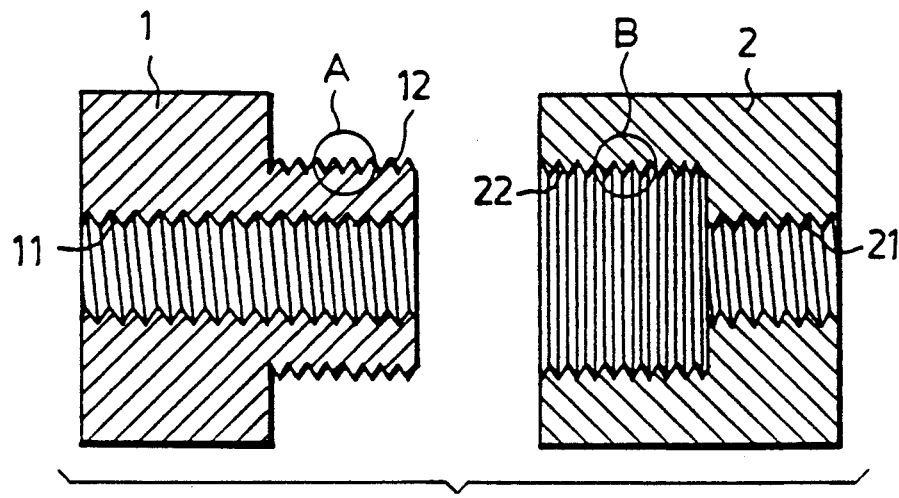
FIG. 2 shows two parts of the lock nut of the present invention.
Figure 3:
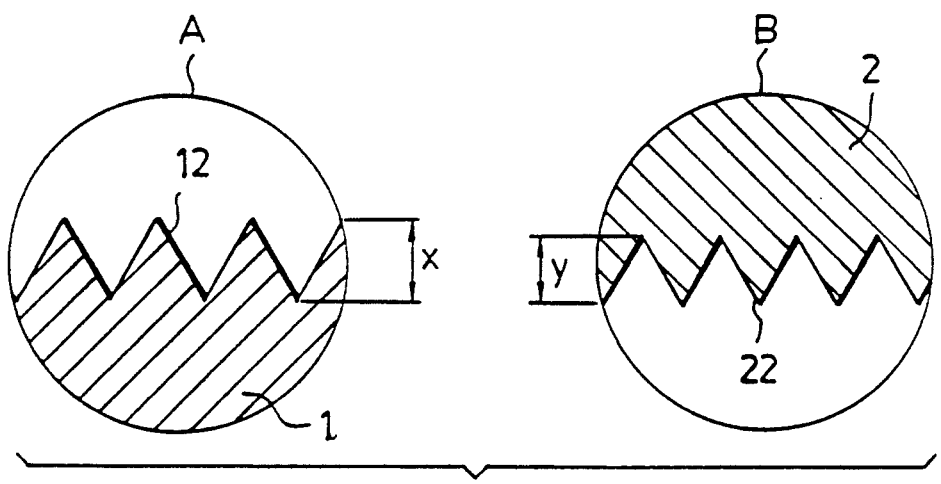
FIG. 3 illustrates details of each of the two parts of FIG. 2.

As illustrated in FIGS. 1 and 2, a bolt of the present invention includes a threaded shaft (b) having a first screw pitch which passes through two objects (51,52) and is fastened by the nut member of the present invention.

The nut member includes two parts, a first half (1) and a second half (2). The first half (1) has a short shank (13) with an internal screw thread (11) therethrough and an external screw thread (12) on the short shank (13). The internal screw thread (11) has a pitch equal to the first screw pitch of the threaded shaft (b) so that it is engageable with the threaded shaft (b) and the external screw thread has a second screw pitch different from the first screw pitch.

The second half (2) includes a threaded bore with two sections of differing radii, a first section and a second section larger than the first section. A first radius defines the first section which has a screw pitch equal to the first screw pitch of the threaded shaft (b) and a second radius defines the second section which has a third screw pitch 22. It is important to note here that one of either of the pitches in the third screw pitch or the second screw pitch on the short shank of the first half is finer than the other. As can be seen in the illustration the second screw pitch 12 has a vertical length "x" and the third screw pitch 22 has a vertical length "y," where "y" is less than "x." The second section of the second half has a horizontal length (L1) slightly longer than the horizontal length (L2) of the short shank of the first half.

When in application, the second half (2) is threaded on the first half (1) as in the illustration and the whole assembly is unitedly threaded on the shaft (b) which passes through two pieces of objects up to a certain tightness. Since the length L1 is greater than the length L2, there is no clearance remaining between the two halves (1,2) as indicated at (c). In order to make a firmer locking, the second half is turned further as the whole nut is turned in a clockwise direction relative to the first half. Whereupon, a deformation of screw pitches occurs between the screw pitch of the internal screw thread of the second half and the external screw pitch on the short shank of the first half. The more the second half (2) is tightened, the more severe the deformation becomes, which provides firm engagement between the two halves. This is the most distinguishing feature of the present invention which is different from the prior art set.

With the invention as explained, it is obvious to those skilled in the art that various modifications and variation can be made without departing from the scope and spirit of the present invention. It is therefore intended that this invention be limited only as in the appended claims.

I claim:

1. A fixing means comprising a bolt having a threaded end threaded at a first screw pitch and a nut member detachable engaged with said threaded end;

wherein the improvement is characterized by said nut member including a first half and a second half, said first half having a short shank with an internal screw thread therein and an external screw thread on said short shank, said internal screw thread of said first half having said first screw pitch and being engageable with said threaded end of said bolt, said external screw thread having a second screw pitch different from said first screw pitch;

said second half having a threaded bore with two sections of differing radii, a first section and a second section wider than said first section, said first section of said second half having said first screw pitch and being engageable with said threaded end of said bolt, said second wider section of said second half having an internal screw thread having a third screw pitch and being engageable with said external screw thread of said first half, one of said second and third screw pitches being slightly finer than the other, wherein said second and third screw pitches have different vertical lengths for lockingly deforming at least one of said external screw threads of said first half and said internal screw thread of said second section of said second half on engagement thereof, and said second wider section having a length slightly longer than a length of said short shank of said first half.

2. A fixing means comprising a bolt having a threaded end threaded at a first screw pitch and a nut member detachable engaged with said threaded end;

wherein the improvement is characterized by said nut member including a first half and a second half, said first half having a short shank with an internal screw thread therethrough and an external screw thread on said short shank, said internal screw thread of said first half having said first screw pitch and being engageable with said threaded end of said bolt, said external screw thread having a second screw pitch different from said first screw pitch, wherein said internal and external screw threads are substantially concentric with one another;

said second half having a threaded bore with two sections of differing radii, a first radius defining a first section and a second radius defining a second section wider than said first section, said first section of said second half having said first screw pitch and being engageable with said threaded end of said bolt, said second section of said second half having an internal screw thread having a third screw pitch and being engageable with said external screw thread of said first half and a length longer than a length of said short shank of said first half and one of said second and third screw pitches being finer than the other, wherein said second and third screw pitches have different vertical lengths for lockingly deforming at least one of said external screw threads of said first half and said internal screw thread of said second section of said second half on engagement thereof.

3. A fixing means as recited in claim 2 wherein said external screw thread of said short shank of said first half is defined by substantially constant first and second radii and said internal screw thread of said second section of said second half is defined by substantially constant third and fourth radii, a difference between said third and fourth radii defining said vertical length of said third screw pitch and a difference between said first and second radii defining said vertical length of said second screw pitch.

4. A fixing means as recited in claim 3 wherein said vertical length of said second screw pitch is greater than said vertical length of said third screw pitch.

5. A fixing means as recited in claim 2 wherein said external screw therad of said short shank of said first half is defined by first and second radii and said internal screw thread of said second section of said second radii defining said vertical length of said second screw pitch.

6. A fixing means as recited in claim 5 wherein said vertical length of said second screw pitch is greater than said vertical length of said third screw pitch.

7. A fixing means as recited in claim 1 wherein said external screw thread of said short shank of said first half is defined by substantially constant first and second radii and said internal screw thread of said second section of said second half is defined by substantially constant third and fourth radii, a difference between said third and fourth radii defining said vertical length of said third screw pitch and a difference between said first and second radii defining said vertical length of said second screw pitch.

8. A fixing means as recited in claim 7 wherein said vertical length of said second screw pitch is greater than said vertical length of said third screw pitch.

9. A fixing means as recited in claim 1 wherein said external screw thread of said short shank of said first half is defined by first and second radii and said internal screw thread of said second section of said second half is defined by third and fourth radii, a difference between said third and fourth radii defining said vertical length of said third screw pitch and a difference between said first and second radii defining said vertical length of said second screw pitch.

10. A fixing means as recited in claim 9 wherein said vertical length of said second screw pitch is greater than said vertical length of said third screw pitch.

11. A fixing means comprising a bolt having a threaded end threaded at a first screw pitch and a nut member detachably engaged with said threaded end;

wherein the improvement is characterized by said nut member including a first half and a second half, said first half having a short shank with an internal screw thread therein and an external screw thread no said short shank, said internal screw thread of said first half having said first screw pitch and being engageable with said threaded end of said bolt, said external screw thread having a second screw pitch different from said first screw pitch;

said second half having a threaded bore with two sections of differing radii, a first section and a second section wider than said first section, said first section of said second half having said first screw pitch and being engageable with said threaded end of said bolt, said second wider section of said second half having an internal screw thread having a third screw pitch and being engageable with said external screw thread of said first half, one of said second and third screw pitches being slightly finer than the other, wherein said second and third screw pitches have different vertical lengths for lockingly deforming at least one of said external screw threads of said first half and said internal screw thread of said second section of said second half on engagement thereof.

12. A fixing means as recited in claim 11 wherein said eternal screw thread of said short shank of said first half is defined by substantially constant first and second radii and said internal screw thread of said second section of said second half is defined by substantially constant third and fourth radii,
   a difference between said third and fourth radii defining said vertical length of said third screw pitch and a difference between said first and second radii defining said vertical length of said second screw pitch.

13. A fixing means as recited in claim 12 wherein said vertical length of said second screw pitch is greater than said vertical length of said third screw pitch.

14. A fixing means as recited in claim 11 wherein said external screw thread of said short shank of said first half is defined by first and second radii and said internal screw thread of said second section of said second half is defined by third and fourth radii,
   a difference between said third and fourth radii defining said vertical length of said third screw pitch and a difference between said first and second radii defining said vertical length of said second screw pitch.

15. A fixing means as recited in claim 14 wherein said vertical length of said second screw pitch is greater than said vertical length of said third screw pitch.

* * * * *